United States Patent [19]

Ramloch et al.

[11] Patent Number: 4,780,244
[45] Date of Patent: Oct. 25, 1988

[54] SALTS, CONTAINING FLUOROALKYL GROUPS, OF BETA-ALKYLAMINO-PROPIONIC ACID ESTERS, A PROCESS FOR THEIR SYNTHESIS AND THEIR USE FOR THE PRODUCTION OF AQUEOUS POLYACRYLATE DISPERSIONS CONTAINING FLUOROALKYL GROUPS

[75] Inventors: Herbert Ramloch, Bad Soden am Taunus; Manfred Seidel; Joachim Lause, both of Frankfurt am Main; Karl Waldmann, Bad Soden am Taunus, all of Fed. Rep. of Germany

[73] Assignee: Hoechst Aktiengesellschaft, Frankfurt am Main, Fed. Rep. of Germany

[21] Appl. No.: 4,589

[22] Filed: Jan. 20, 1987

Related U.S. Application Data

[62] Division of Ser. No. 696,730, Jan. 31, 1985, Pat. No. 4,658,052.

[30] Foreign Application Priority Data

Feb. 4, 1984 [DE] Fed. Rep. of Germany ....... 3403880

[51] Int. Cl.$^4$ ..................... B01F 17/16; B01F 17/28; C07C 101/02
[52] U.S. Cl. .................................. 252/308; 252/357; 560/155; 260/DIG. 45
[58] Field of Search ................ 560/155; 252/308, 357; 260/DIG. 45

[56] References Cited

U.S. PATENT DOCUMENTS 3,776,857 12/1973 Lindner ................. 252/308
4,297,107 10/1981 Boehmke ............... 252/308 X
4,379,869 4/1983 Saidat et al. .

FOREIGN PATENT DOCUMENTS 1200987 8/1970 United Kingdom .

Primary Examiner—John F. Terapane
Assistant Examiner—Susan Wolffe

[57] ABSTRACT

Compound of the formula

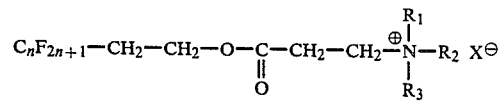

in which n denotes a number from 4 to 12, preferably 6 to 8, $R_1$ denotes hydrogen or methyl, preferably hydrogen, $R_2$ and $R_3$ denote $C_1$–$C_6$-alkyl, preferably propyl or butyl, and X denotes halogen, $HSO_4$ or anions of organic acids having 1 to 4 carbon atoms, or $CH_3OSO_3$, and preferably denotes chlorine.

These compounds are used on their own or together with non-ionic surfactants as an emulsifier for the production of aqueous polymer dispersions of fluorine-containing acrylic acid esters. Polymer dispersions of this type, formed from fluorine-containing acrylic acid esters, are used for imparting an oleophobic and hydrophobic finish to textile materials.

3 Claims, No Drawings

SALTS, CONTAINING FLUOROALKYL GROUPS, OF BETA-ALKYLAMINO-PROPIONIC ACID ESTERS, A PROCESS FOR THEIR SYNTHESIS AND THEIR USE FOR THE PRODUCTION OF AQUEOUS POLYACRYLATE DISPERSIONS CONTAINING FLUOROALKYL GROUPS

This is a division of application Ser. No. 696,730, now U.S. Pat. No. 4,658,052.

It is known to polymerize monomeric, fluorine-containing acrylic acid derivatives in an aqueous dispersion in the presence of cationic or anionic emulsifiers. Aqueous dispersions are therefore to be understood as meaning polymer dispersions which can contain organic solvents, but which must be capable of being diluted very greatly with water. These aqueous polymer dispersions, the essential components of which comprise acrylic acid esters containing perfluoroalkyl groups, are widely used in finishing textile fabrics, the latter then having oleophobic and also hydrophobic properties.

Emulsifiers which have a very good dispersing power for the monomers employed, but also for the polymers formed, are required in the preparation of these aqueous polymer dispersions. The emulsifiers known hitherto which can be used for this purpose are composed of a perfluoroalkyl moiety and an anionic or cationic component. An emulsifier of this type is often combined with a fluorine-free emulsifier and is in most cases also employed conjointly with a solvent in order to obtain a stable polymer dispersion which can be diluted with water. The oleophobic and hydrophobic effect which can be achieved with aqueous, fluorine-containing polymer dispersions is impaired by the hydrophilic constituent of the emulsifiers.

The invention described herein is based on the conception of preparing aqueous, fluorine-containing polymer dispersions by means of an emulsifier which, under the conditions of imparting a finish to textile fabrics by means of a fluorine-containing polymers of this type, dispersed in water, breaks down into 2 fragments, a hydrophobic, fluorine-containing moiety and a hydrophilic moiety. This would render the emulsifier ineffective and redispersion of the fluorine-containing polymer impossible and would produce an increase in the desired finishing effect by means of the hydrophobic fragment of the emulsifier. A further increase in the effect is possible in that this fluorine-containing emulsifier fragment contains a functional group by means of which it is possible to form a link with the textile fabric, with itself or with constituents of the finish.

It is known through Swiss Pat. No. 280,474 that $\alpha$-,$\beta$-unsaturated carboxylic acid esters can be prepared from $\beta$-halogenocarboxylic acid esters by eliminating HCl by means of trimethylamine at approx. 80°–90°. This elimination of HCl is effected via the quaternary ammonium salt, which is not stable under these conditions.

The invention relates to new salts, containing fluoroalkyl groups, of $\beta$-alkylamino propionic acid esters of the general formula

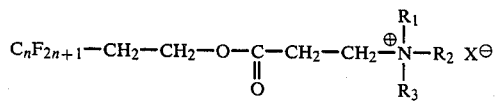

in which n denotes a number from 4 to 12, preferably 6 to 8, $R_1$ denotes hydrogen or methyl, preferably hydrogen, $R_2$ and $R_3$ denote $C_1$-$C_6$-alkyl, preferably propyl or butyl, and X denotes halogen, $HSO_4$ or anions of organic acids having 1 to 4C atoms, or $CH_3OSO_3$, and preferably denotes chlorine.

The synthesis route leading to these compounds starts from the ethyl perfluoroalkyl acrylate I, to which a secondary amine is attached by an addition reaction.

An ethyl perfluoroalkyl $\beta$-dialkylaminopropionate (II) is formed, and, as a result of subsequent quaternisation, for example using dimethyl sulfate, the quaternary ammonium salt III is formed.

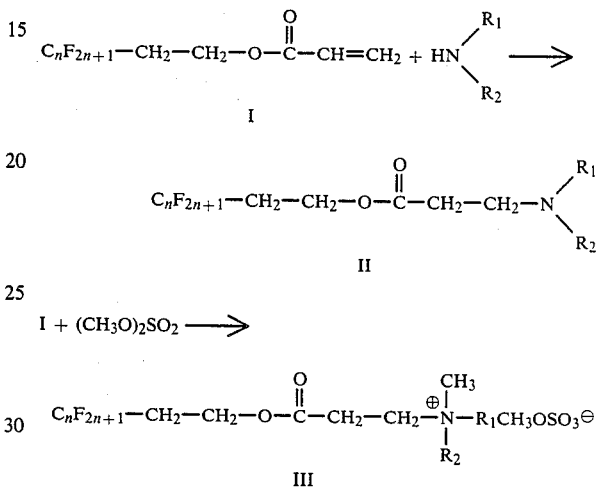

$n=4$ to 12, $R_1=R_2=C_aH_{2a+1}$, $a=1$ to 6.

The perfluoroalkyl radical in the compounds I to III comprises 4 to 12 carbon atoms, the best emulsifier properties being obtained at 6 to 8 carbon atoms. $R_1$ and $R_2$ contain 1 to 6 carbon atoms, preferably 2 to 4 carbon atoms.

The combinations of compounds of the formula III with alkyl phenols having 4–12 carbon atoms in the alkyl group, condensed with 5 to 25 moles of ethylene oxide, or with coconut oil fatty alcohol condensed with 5–15 moles of ethylene oxide, or a $C_{16}/C_{18}$ mixture of alcohols (approx. 33/66%) condensed with 8–25 moles of ethylene oxide, have proved particularly effective emulsifier systems.

When 100 parts of an aqueous polymer dispersion containing 20–25 parts of perfluoroalkyl acrylates are prepared, a 2.5–4 parts of a compound of the formula III and 1–2.5 parts of the abovementioned ethylene oxide condensation products are required. It is not necessary to add solvent. A very transparent aqueous dispersion is obtained.

The stability of such dispersions at 20°–25° C. is approx. 3 months, while at 40°–50° C. it is approx. 1–2 days. The emulsifier III, as a 100% strength product, can only be stored for a few days at room temperature. The cleavage of the quaternary ammonium salt III into the acrylic acid ester I thus takes place at temperatures as low as 20°–25° C.

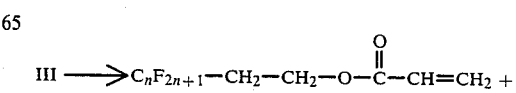

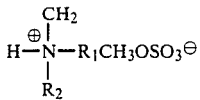

It has also been found, surprisingly, that aqueous, fluorine-containing polymer dispersions having the same transparency, but an increased stability to heat—their stability in storage is more than 4 weeks at 50°—can be obtained if the precursor, the β-dialkylaminopropionic acid ester II is used in the form of a salt, for example as the hydrochloride, instead of the quaternary compound III. The emulsifier mixture in combination with the above-mentioned oxyethylates is just as good as in the case of the emulsifier system containing the quaternary salt III, if 4-6 parts of the compound II in the form of a salt, for example as the hydrochloride, are used together with 1-3 parts of the said oxethylates for the preparation of 100 parts of aqueous polymer dispersion containing 20-25 parts of perfluoroalkyl acrylates. The amine II can be stored for an indefinite period at room temperature and only when used is it converted into the salt by adding, for example, hydrochloric acid or dilute sulfuric acid. The cleavage of this fluorine-containing β-alkylaminopropionic acid ester-salt into the corresponding acrylic acid ester and the salt of the dialkylamine takes place above 100°.

As the main constituent of an emulsifier system, these compounds according to the invention have an excellent emulsifying power for the fluorine-containing acrylic acid esters in water, so that the emulsion polymerisation can be carried out readily. The aqueous polymer dispersions, containing about 17-18% of fluorine, prepared in this way without the use of organic solvents are surprisingly transparent and have a good stability on storage.

The fluorine-containing, aqueous polymer dispersions prepared using this emulsifier produce particularly good oleophobic and hydrophobic effects on the textile fabrics finished therewith, since the emulsifier becomes ineffective, at temperatures above 100° C., under the conditions of the finishing process.

EXAMPLES

1. Preparation of an ethyl perfluoroalkyl β-dialkylaminopropionate 42 g (0.1 mole) of ethylperfluorohexyl acrylate are initially taken, and 12.9 g (0.1 mole) of dibutylamine are added, with stirring. When the evolution of heat was subsided, the reaction is complete. The ethylperfluorohexyl β-dibutylaminopropionate thus formed is a colorless oil.

1.1. If acrylic acid esters which are solid at room temperature are used, for example ethylperfluorodecyl acrylate, these esters are initially taken in a dissolved state, and the solvent is removed by distillation after the completion of the reaction. Isopropanol is very suitable as a solvent in this reaction.

1.2. The reaction with, for example, diethylamine, dipropylamine or dihexylamine takes place in the same way as that described in 1 and 1.1.

2. Preparation of a β-dialkylammonium propionic acid ethylperfluoroalkyl ester-salt.

The corresponding β-dialkylaminopropionic acid ester ethyl perfluoroalkyl ester-hydrochloride is obtained by passing HCl gas into an isopropanol solution of ethyl perfluoroalkyl β-dialkylaminopropionate and subsequently removing the alcohol by distillation.

2.1. For using the product further as an emulsifier for aqueous dispersions it is advantageous to prepare these salts by dispersing the β-dialkylaminopropionic acid ester compound in water by stirring, and adding, for example, hydrochloric acid, dilute sulfuric acid, acetic acid or glycolic acid. The aqueous salt solutions can thus be used as emulsifier solutions.

3. Preparation of a β-trialkylammonium propionic acid ethylperfluoroalkyl ester-salt 54.7 g (0.1 mole) of ethylperfluorohexyl β-dibutylamino propionate are dissolved in 100 ml of ethyl acetate and 12.6 g (0.1 mole) of dimethyl sulfate added. When the evolution of heat was subsided, the ethyl acetate is removed by distillation. The colorless, crystalline, quaternary ammonium salt is left as residue.

3.1. For using the product further as an emulsifier for aqueous dispersions, it is advantageous to disperse the dialkylamino compound in water by stirring and to add dimethyl sulfate. When the evolution of heat was subsided, the solution of the quaternary salt can be used as an emulsifier solution.

4. Preparation of aqueous polymer dispersions containing perfluoroalkyl groups Example 4.1

25 parts by weight of an ethylperfluoroalkyl acrylate mixture of the following approximate composition:
2.5% of $C_6F_{13}CH_2CH_2OCOCH=CH_2$,
61.5% of $C_8F_{17}CH_2CH_2OCOCH=CH_2$,
27% of $C_{10}F_{21}CH_2CH_2OCOCH=CH_2$,
7.5% of $C_{12}F_{25}CH_2CH_2OCOCH=CH_2$ and
1.5% of $C_{14}F_{29}CH_2CH_2OCOCH=CH_2$, 1 part by weight of lauryl acrylate, 0.3 part by weight of acrylamide and 1.5 parts by weight of stearyl alcohol condensed with 15 moles of ethylene oxide are initially taken and 73 parts by weight of a solution prepared by dispersing 5 parts by weight of ethylperfluorohexyl β-dibutylamino propionate in water, adjusting the pH to 2.5 with hydrochloric acid and making up with water, are added thereto. After the mixture has been heated to 50° C., stirring produces an emulsion, which is stirred for approx. 30 minutes at 50° C. under an atmosphere of nitrogen. Polymerization is then initiated by adding 0.1 part by weight of azodiisobutyramidine.2HCl and heating the mixture to 65° C. Th polymerization is complete after 3 hours of vigorous stirring at 65° to 70° C. Cooling to room temperature gives a nearly water-white polymer dispersion.

Example 4.2.

25 parts by weight of an ethylperfluoroalkyl acrylate mixture of the same composition as that described in Example 4.1, 1 part by weight of lauryl acrylate, 0.3 part by weight acrylamide and 1.5 parts by weight of nonylphenol condensed with 8 moles of ethylene oxide are initially taken, and 75 parts by weight of a solution prepared from 3 parts by weight of ethylperfluorohexyl β-dibutylaminopropionate which has been dispersed in water by stirring and quaternized by adding 0.7 part by weight of dimethylsulfate and made up to the desired concentration with water after the heat of the reaction has subsided (approx. 45 minutes), are added. After the mixture has been heated to 50° C., stirring produces an emulsion, which is stirred for approx. 30 minutes at 50° C. under an atmosphere of nitrogen. Polymerization is then initiated by adding 0.1 part by weight of azodiisobutyramidine.2 HCl and 0.03 part by weight of ascorbic acid and heating to 65° C. The polymerization is complete after 3 hours of vigorous stirring at 65°–70° C. Cooling to room temperature gives a nearly water-white polymer dispersion.

5. Polymer dispersion; comparison example 25 parts by weight of an ethylperfluoroalkyl acrylate mixture of the approximate composition described in Example 4.1., 1 part by weight of lauryl acrylate, 0.3 part by weight of acrylamide, 2.5 parts by weight of Na tetrahydroperfluorooctyloxacarboxamidolethylthiosulfate ($C_6F_{13}CH_2CH_2OCONHCH_2CH_2S_2O_3Na$) as emulsifier, 12.5 parts by weight of isopropanol and 59 parts by weight of water are heated to 50° C. under an atmosphere of $N_2$, with stirring. After the mixture has been stirred for 30 minutes at 50° C., polymerization is initiated by means of 0.1 part by weight of ammonium peroxydisulfate (($NH_4)_2S_2O_8$) and 0.03 part by weight of ascorbic acid. The mixture is stirred for a further 4 hours at 50°–55° C. and is then cooled to room temperature.

6. Comparison test of the fluorine-containing, aqueous polymer dispersion of Example 4.1 and Example 5

The following were employed per 1 liter of finishing liquor: 6 g of polymer dispersion from either Example 4.1 or Example 5, 3 g of a 50% strength solution of a highly etherified methylolmelamine methyl ether and 6 g of a 25% strength solution of zinc sulfate. This was used to impregnate a polyamide taffeta fabric, which was squeezed out to a residue of 40%, dried at 110° and subjected to condensation at 170° for 20 seconds.

The hydrophobic and oleophobic effects measured on this polyamide taffeta fabric are summarized in the table below.

| Test | | Ex. 4.1 | Ex. 5 |
|---|---|---|---|
| Water repellency: | Spray test (AATCC 22) | | |
| | At start | 100 | 90 |
| | After 3 washes at 60° | 80 | 50 |
| | After being dry-cleaned 3 times | 100 | 70 |
| | Bundesmann (DIN 53 888) | | |
| | % water absorption at start | 12.1 | 19.4 |
| | After 3 washes at 60° | 32.2 | 32.6 |
| | After being dry cleaned 3 times | 26.8 | 27.1 |
| | ml of leakage at start | 20 | 32 |
| | After 3 washes at 60° | 13 | 42 |
| | After being dry-cleaned 3 times | 28 | 28 |

| Test | | Ex. 4.1 | Ex. 5 |
|---|---|---|---|
| -continued | | | |
| Oil repellency: | 3 M Test | | |
| | At start | 100 | 80 |
| | After 3 washes at 60° | 90 | 60 |
| | After being dry-cleaned 3 times | 90 | 70 |
| | Test as specified in AATCC 118 | | |
| | At start | 5 | 3 |
| | After 3 washes at 60° | 4 | 1 |
| | After being dry-cleaned 3 times | 4 | 2 |

We claim:
1. A composition comprising
(a) a compound of the formula (I)

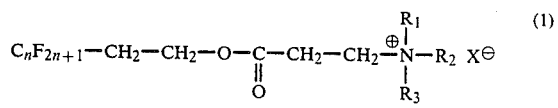

in which
n denotes a number from 4 to 12,
$R_1$ denotes hydrogen or methyl,
$R_2$ and $R_3$ denote ($C_1$–$C_6$)-alkyl and
X denotes halogen, $HSO_4$ or anions of organic acids having 1 to 4 carbon atoms, or $CH_3OSO_3$, and
(b) a $C_4$ to $C_{12}$ alkylphenol which has been condensed with 6 to 25 moles of ethylene oxide, or an alcohol which has 10 to 18 carbon atoms and has been condensed with 5 to 25 moles of ethylene oxide.

2. An aqueous polymer dispersion comprising a fluorine-containing polymer dispersed in the aqueous medium and, as an emulsifier, a composition as claimed in claim 1.

3. An aqueous polymer dispersion comprising a fluorine-containing polymer dispersed in the aqueous medium and, as an emulsifier, a compound of formula (I)

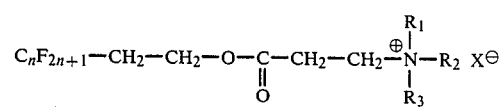

in which
n denotes a number from 4 to 12,
$R_1$ denotes hydrogen or methyl,
$R_2$ and $R_3$ denote ($C_1$–$C_6$)-alkyl and
X denotes halogen, $HSO_4$ or anions of organic acids having
1 to 4 carbon atoms, or $CH_3OSO_3$.

* * * * *